July 20, 1954
J. A. PERRY
2,684,122
HELICOPTER ROTOR STRUCTURE
Filed Jan. 24, 1952
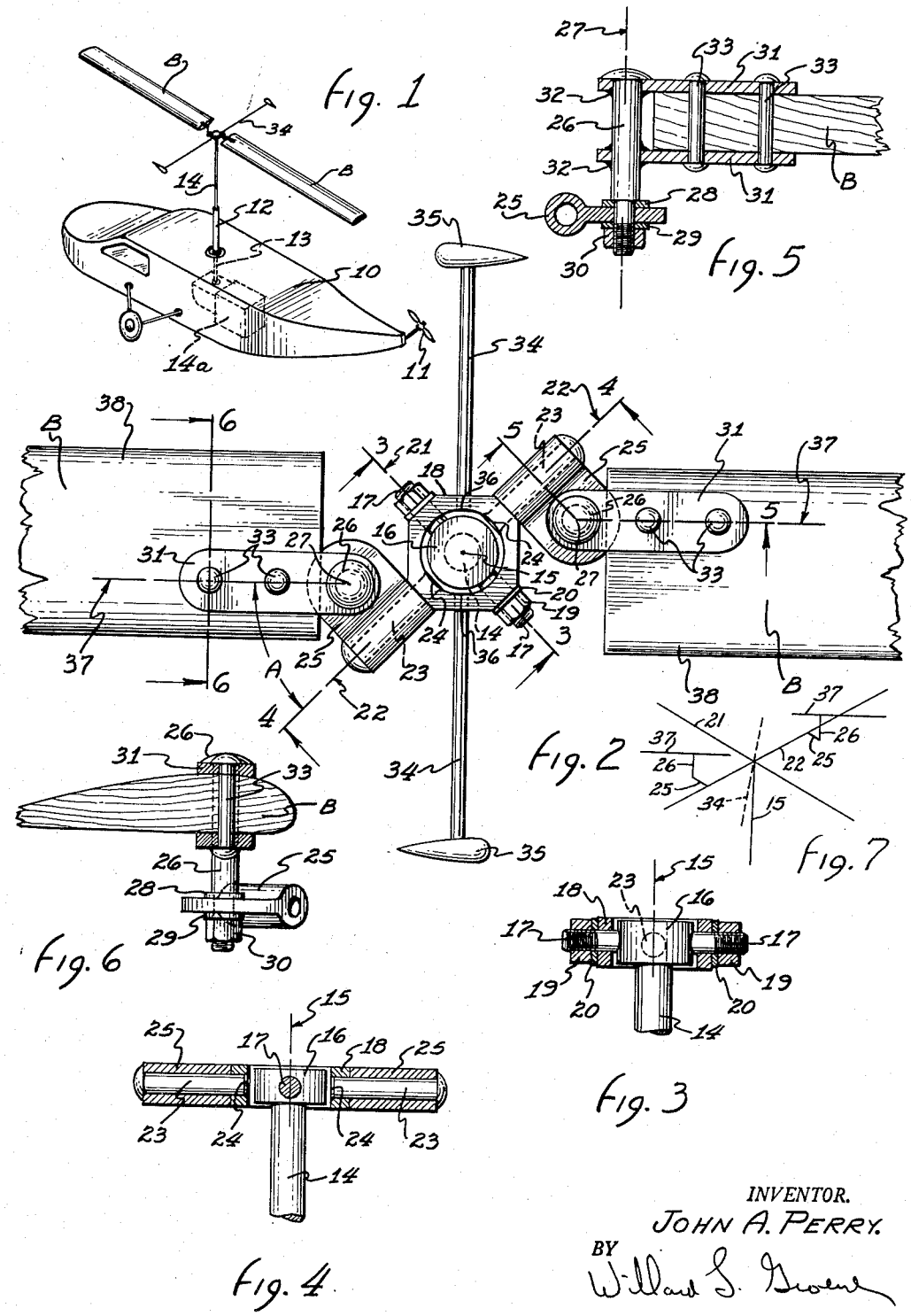
INVENTOR.
JOHN A. PERRY.
BY
Willard S. Groene
ATTORNEY.

Patented July 20, 1954

2,684,122

UNITED STATES PATENT OFFICE 2,684,122

HELICOPTER ROTOR STRUCTURE

John A. Perry, Phoenix, Ariz.

Application January 24, 1952, Serial No. 268,069

10 Claims. (Cl. 170—160.13)

This invention pertains to improvements in helicopter rotor structures and is particularly directed to an improved pivotally and rockably mounted blade construction.

One of the objects of this invention is to provide an improved helicopter wing structure in which the wings are pivotally mounted each side of their chord on the hub structure of the helicopter rotor.

Still another object of this invention is to provide an improved helicopter universal joint rotor hub having blades attached pivotally to the hub for rocking motion about axes angularly related to the blade axis.

Still another object of this invention is to provide an improved helicopter rotor blade assembly in which the chordwise axis of the blades is angularly related to the universal pivotal axes of the universal joint rotor hub.

It is also a further object of this invention to provide an arrangement as recited above, but in which the wings or blades are pivotally mounted for swinging movement in a plane substantially perpendicular to the main vertical shaft axis of rotation of the rotor.

Further features and advantages of this invention will appear from a detailed description of the drawing in which:

Fig. 1 is a general perspective view of a helicopter having a rotor incorporating the features of this invention.

Fig. 2 is an enlarged fragmentary plan view particularly showing the rotor structure of the helicopter incorporating the features of this invention.

Fig. 3 is a section on the line 3—3 of Fig. 2.

Fig. 4 is a section on the line 4—4 of Fig. 2.

Fig. 5 is a section on the line 5—5 of Fig. 2.

Fig. 6 is a section on the line 6—6 of Fig. 2.

Fig. 7 is a diagram showing the essential axes of movement and their relationship in the rotor structure.

For exemplary purposes there is shown a helicopter having the main fuselage 10, the tail rotor 11 and the vertical supporting post 12 having the usual drive shaft 13 connected to the main drive motor 14a carried in the fuselage of the plane. The vertical drive shaft 13 is suitably connected to the main rotor shaft 14 in a conventional manner so that the shaft 14 may be rotatably driven at variable speeds from the motor 14a and may have its axis 15 tilted relative to the fuselage of the helicopter so as to effect directional control of the aircraft.

The shaft 14 terminates in a hub 16 having trunnion bearings 17 upon which is rotatably journaled the universal joint rotor hub member 18. Suitable adjustable nuts 19 and washers 20 are arranged to limit relative axial movement of the hub member 18 on the trunnion 17 with regard to the axis of rocking movement 21. Also fixed on the hub member 18 on an axis 22 located at right angles to the axis 21 and lying substantially in the same plane therewith are the pivot or hinge pin members 23 each of which are secured rigidly to the member 18 by any suitable means at the point 24. Pivotally mounted on the pins 23 are the hinge pieces 25 on the outer ends of which are carried the vertical offset shafts 26 having their axes 27 located substantially in a vertical direction when the rotor is in operation which offset the wings upwardly so that they travel in a disc of rotation above the plane defined by the axes 21 and 22 as best seen in Figs. 5 and 6. The lower ends of the shafts 26 are confined between washers 28 and 29 and the adjusting nut 30 with regard to the hinge members 25 and may be either clamped rigidly in normal operating position as shown in Fig. 2 or the nut 30 may be adjusted to allow a frictional engagement between the washers 28 and 29 and the hinge member 25 whereby sufficient torque may be transmitted from the shaft 14 to initially effect rotation of the blades B without their collapsing or swinging around the axis 27 toward the shaft 14 during changes in acceleration of the driving motor 14a. The blades B may be suitably connected to the shafts 26 by means of the clamp pieces 31 which are welded at 32 to the shafts 26 and connected by means of suitable rivets 33 passing thru the wing structures B, as best seen in Fig. 5.

In order to add the usual stability to the rotor member 18 there is also provided the main rotor stabilizer bars 34 on the outer end of which are provided streamlined weights 35 rigidly secured to their outer ends, the inner ends of the bars being rigidly secured at 36 to the member 18. The purpose of the stabilizer bars 34 and their weights 35 provides the necessary stability to the helicopter by taking advantage of the inertia of the bars and weights to maintain the member 18 in a substantially constant plane of rotation to prevent too sudden a change of direction or movement of hunting action of the helicopter when change of direction is effected by manipulating the vertical drive shaft 14.

It is important to note that a definite angular relationship is provided during normal flight between the axis 22 of the hinge pins 23 and the longitudinal blade axis 37 of each of the blades B as indicated by the angle A. This angle A may be determined automatically upon rotation of the rotor when driven by the motor 14a thru the frictional engagement of the washers 28 and 29 with the hinge piece 25 or other equivalent structure permitting the frictional resistance between the rotation of the shaft 26 and the hinge members 25. The reason for this automatic adjustment of the angle A during flight lies in the fact that centrifugal force during rotation of the blades B would normally not be effective to overcome the effect of gravity causing the rearward or trailing edge portion 38 of the blades B to swing downwardly about the axis 22 when the axial extent 37 of the blades B is substantially parallel to the axis 22. However, when the wing B is swung back with its axis 37 angularly related to the pivot axis 22, Fig. 2, and since it is located above said axis as seen in Figs. 5 and 6, this shift of the mass of the wing allows centrifugal force to cause the wing to swing downwardly about the axis 22 to present the proper angle of attack for the wing for the particular flight conditions. Thus as the angle A automatically adjusts itself, or is arranged in a specific position for certain operating conditions by locking the shafts 26 to the hinge members 25 to obtain the desired angle A, the forces causing the trailing edge to drop downwardly and those causing it to swing upwardly exactly balance so as to maintain the wing with its average mean chord in proper angle of attack for the particular operating conditions of the aircraft. Thus the entire rotor structure is automatic in its operation, simple in construction and free from elaborate cams and actuating mechanism as found in more conventional types of rotors since the offset hinging effect around the pins 23 and the automatic adjustment of the shafts 26 around the axes 27 gives the necessary change of characteristics of lift, drag and angle of attack for the blades B during varying conditions of motor operation and flight control of the helicopter.

While the apparatus herein disclosed and described constitutes a preferred form of the invention, it is also to be understood that the apparatus is capable of mechanical alteration without departing from the spirit of the invention and that such mechanical arrangement and commercial adaptations as fall within the scope of the appendent claims are intended to be included herein.

Having thus fully set forth and described this invention what is claimed and desired to be obtained by United States Letters Patent is:

1. In a helicopter rotor structure, a vertical drive shaft, diametrically disposed trunnions fixed on said drive shaft, a rotor hub pivotally mounted on said trunnions for rocking movement on the diametral axis of said trunnions, a plurality of rotor blades, hinge pin members fixed on said rotor hub having a diametral axis at right angles to and lying in the same plane with the axis of said trunnions, hinge pieces pivotally mounted on said hinge pin members for rocking movement about the diametral axis of said hinge pin members, pivot shafts carried on said hinge pieces having substantially vertically disposed axes offset from the axis of said hinge pin members connected to support said blades to allow horizontal swinging movement of said blades in a plane substantially at right angles to the axis of rotation of said drive shaft, and means to secure said blades to said pivot shafts with said blade axes located above said plane defined by said diametral axes.

2. In a helicopter rotor structure having a vertical drive shaft, a pair of diametrically disposed trunnions fixed on the upper end of said shaft, a rotor hub pivotally mounted on said trunnions, a plurality of hinge pin members fixed in said hub having their axes at right angles to and lying in the same plane with the diametral axis of said trunnions, hinge pieces pivotally mounted on said hinge pin members, blade offset supporting pivot shafts having their axes substantially perpendicular to a plane defined by both of said mentioned axes and offset from the axis of said hinge pin member so as to support said blades in a disc of rotation above said plane, and means for pivotally connecting said blades to said vertical pivot shafts so that the blade axes of said blades are radially disposed between axis of said trunnions and the axis of said hinge pin members.

3. In a helicopter rotor structure having a vertical drive shaft, a pair of diametrically disposed trunnions fixed on the upper end of said shaft, a rotor hub pivotally mounted on said trunnions, a plurality of hinge pin members fixed in said hub having their axis at right angles to and lying in the same plane with said axis of said trunnions, hinge pieces pivotally mounted on said hinge pin members, blade offset supporting pivot shafts having their axes substantially perpendicular to a plane defined by both of said mentioned axes so as to support said blades in a disc of rotation above said plane, and means for pivotally connecting said blades to said vertical pivot shafts, a pair of diametrically disposed stabilizer bars fixed to said rotor hub positioned in an angular relationship to the axes of said trunnions and said hinge pin members, and weights fixed on the outer ends of said stabilizer bars rotating in a plane parallel with the disc of rotation of said blades.

4. A helicopter rotor structure comprising a main vertical drive shaft, a rotor hub, diametrically disposed trunnions fixed on said drive shaft, means for pivotally mounting said hub on said trunnions on the upper end of said main vertical drive shaft of said helicopter, a plurality of blades, hinge pin members fixed on said hub, hinge pieces pivotally mounted on said hinge pin members for rocking movement about an axis lying in a plane parallel to and passing through the axis of said vertical drive shaft and at right angles to a plane defined by the axes of said trunnions and hinge pin members, and further means on said hinge pieces for pivotally mounting said blades in a disc of rotation above said plane for swinging movement about vertical axes parallel to said vertical drive shaft and set back from said diametral axis of said hinge pin members in a direction opposite from the direction of rotation of said blades.

5. A helicopter rotor structure comprising, a main vertical drive shaft, a rotor hub, diametrically disposed trunnions fixed on said drive shaft, means for pivotally mounting said hub on said trunnions on the upper end of said main vertical drive shaft of said helicopter, a plurality of blades, hinge pin members fixed on said hub, hinge pieces pivotally mounted on said hinge pin members for rocking movement about an axis lying in a plane parallel to and passing through the axis of said vertical drive shaft and at right angles to a plane defined by the axes of said trunnions and hinge pin members, and further means on said hinge pieces for pivotally mounting said blades in a disc of rotation above said plane for swinging movement about vertical axes parallel to said vertical drive shaft, and frictional restrictive means between said hinge pieces and said blades, the axes of said further means being set back from the axis of said hinge pin members in a direction opposite from the direction of rotation of said blades.

6. A helicopter rotor structure comprising, a main vertical drive shaft, a rotor hub pivotally mounted about a diametral horizontal axis on trunnions fixed on the upper end of said main vertical drive shaft of said helicopter, a plurality of blades pivotally mounted on hinge pin members fixed on said hub for rocking movement about axes lying in a plane parallel to and passing through the axis of said vertical drive shaft and at right angles to said diametral axis of said trunnions, further means pivotally supported on said hinge pin members for pivotally mounting said blades in a disc of rotation above a plane defined by the axes of said trunnions and hinge pin members for swinging movement about vertical axes parallel to said vertical drive shaft axis, frictional restrictive means between said hinge pieces and said blades to frictionally limit said horizontal swinging movement of said blades, the axes of said further means being set back from the axis of said hinge pin members in a direction opposite from the direction of rotation of said blades, and stabilizer weight means including diametrically disposed bars fixed to said rotor hub in an angular position between said diametral axis and said blade pivot axis for rotation about an axis substantially coincident with the axis of rotation of said vertical drive shaft.

7. In a helicopter rotor structure having, a vertical drive shaft, a rotor hub pivotally mounted on a diametrically disposed axis on trunnions carried on said drive shaft, a plurality of hinge pieces pivotally mounted on hinge pin members carried on said hub for rocking about an axis perpendicular to a plane defined by the axis of rotation of said vertical drive shaft and the axis of rocking movement of said rotor hub on said drive shaft, means on said hinge pieces for supporting blades for swinging movement about axes substantially parallel to the axis of said drive shaft on each of said hinge pieces, and means on said last mentioned means to position said blades for rotation in a plane above said plane defined by the axes of said trunnions and said hinge pin members.

8. In a helicopter rotor structure having, a vertical drive shaft, a rotor hub pivotally mounted on a diametrically disposed axis on trunnions carried on said drive shaft, a plurality of hinge pieces pivotally mounted on hinge pin members carried on said hub for rocking about an axis perpendicular to a plane defined by the axis of rotation of said vertical drive shaft and the axis of rocking movement of said rotor hub on said drive shaft, means on said hinge pieces for supporting blades for swinging movement about axes substantially parallel to the axis of said drive shaft on each of said hinge pieces including vertically disposed pivotal mounting means between said blades and said hinge pieces positioned back from said axis of said hinge pin members on said hub in a direction opposite to the direction of rotation of said blades, and means for mounting said blades on said vertically disposed pivotal mounting means to allow limited swinging movement of said blades in a plane parallel to said plane defined by said axes of said hinge pin members and said trunnions.

9. In a rotor structure, a main drive shaft having a vertical axis of rotation, a hub, trunnions on said drive shaft having a horizontal diametral axis of pivotal mounting on said drive shaft, a plurality of blade carrying hinge pieces, hinge pin members on said hub having radially disposed hinge axes lying in a plane defined by said trunnion diametral axis and at right angles to said main drive shaft axis of rotation, hinge pieces pivotally mounted on said hinge pin members, offset blade supporting means on said hinge pieces having axes of rocking movement substantially parallel to said main drive shaft axis and located back from said hinge pin member axis in a direction opposite to the direction of rotation of said rotor structure, and rotor blade mounting means on said offset blade supporting members connected to the blades of said rotor structure so that said blades revolve in a disc of rotation above a plane defined by said diametral axes of said trunnions and said hinge pin members and with the longitudinal axis of said blades in an angularly related position to said axes.

10. In a rotor structure, a main drive shaft having a vertical axis of rotation, a hub, trunnions on said drive shaft having a horizontal diametral axis of pivotal mounting on said drive shaft, a pair of blade carrying hinge pieces pivotally mounted on said hinge pin members on each side of said hub having a diametral hinge axis located at right angles to a plane defined by said main drive shaft axis, and said trunnion diametral axis, offset blade supporting means on said hinge pieces having axes of rocking movement substantially parallel to said main drive shaft axis and located back from said hinge pin member diametral axis in a direction opposite to the direction of rotation of said rotor structure, and rotor blade mounting means on said offset blade supporting members connected to the blades of said rotor structure in a position so that said blades revolve in a disc of rotation above said plane defined by said diametral axes of said trunnions and said hinge pin members and with the longitudinal axis of said blades angularly related to the diametral hinge axis.

References Cited in the file of this patent

UNITED STATES PATENTS

| Number | Name | Date |
| --- | --- | --- |
| 1,742,665 | Oehmichen | Jan. 7, 1930 |
| 2,045,355 | Hays | June 23, 1936 |
| 2,086,802 | Hays | July 13, 1937 |
| 2,127,105 | Campbell | Aug. 16, 1938 |
| 2,510,006 | Young | May 30, 1950 |
| 2,569,061 | Hunt | Sept. 25, 1951 |

FOREIGN PATENTS

| Number | Country | Date |
| --- | --- | --- |
| 598,878 | Great Britain | Feb. 27, 1948 |